United States Patent [19]

Anderson et al.

[11] 4,245,665
[45] Jan. 20, 1981

[54] FLUID HEATER FOR PNEUMATIC CONTROL MECHANISMS

[75] Inventors: Celius R. Anderson, Pekin; Curtis E. Chadwick, II, Edelstein, both of Ill.

[73] Assignee: Caterpillar Tractor Co., Peoria, Ill.

[21] Appl. No.: 91,676

[22] PCT Filed: Oct. 10, 1979

[86] PCT No.: PCT/US79/00837

§ 371 Date: Oct. 10, 1979

§ 102(e) Date: Oct. 10, 1979

[51] Int. Cl.³ .............................................. F16K 49/00
[52] U.S. Cl. .................................... 137/341; 137/351; 219/306; 219/368
[58] Field of Search ....................... 137/334, 341, 351; 165/102, 128, 129, 130; 219/306, 307, 373, 374, 379, 380, 381

[56] References Cited

U.S. PATENT DOCUMENTS

| | | |
|---|---|---|
| 1,439,340 | 12/1922 | St. Clair . |
| 1,557,682 | 10/1925 | Gazelle . |
| 1,694,351 | 12/1928 | Long . |
| 1,825,793 | 10/1931 | Heroy . |
| 2,394,868 | 2/1946 | Morgenier . |
| 2,438,865 | 3/1948 | Rehard . |
| 3,733,459 | 5/1973 | Lengstorf . |
| 3,906,813 | 9/1975 | Webber et al. . |
| 4,147,923 | 4/1979 | Davis et al. . |

FOREIGN PATENT DOCUMENTS 228184 12/1958 Australia .

OTHER PUBLICATIONS

Caterpillar Tractor Co. Service Manual for 7155 Trasmission, pp. 27 and 28.

Primary Examiner—Gerald A. Michalsky
Attorney, Agent, or Firm—Phillips, Moore, Weissenberger, Lempio & Majestic

[57] ABSTRACT

Pneumatically operated control mechanisms (10-18) for vehicles have often been found to leak control fluid during start-up in extreme cold conditions until attaining normal operating temperature. It has been discovered that the problem lay in loss of resiliency of poppet valves (21) because of the exposure of the elastomer seals (24,26) to extremely cold ambient operating conditions. The problem has been solved by heating the incoming air. Reliable heating is accomplished under extreme cold conditions by use of a fluid heater (40) having an elongated heating member (41) and inner and outer sleeves (48,51) around the heating member to provide inner and outer annular spaces (49,52) through which the fluid to be heated flows in counter-current directions.

6 Claims, 3 Drawing Figures

FLUID HEATER FOR PNEUMATIC CONTROL MECHANISMS

DESCRIPTION

1. Technical Field

This invention relates to pneumatically operated control mechanisms.

2. Background Art

Various vehicle have a control system as shown in FIG. 1 herein, wherein a transmission shifting mechanism 10 couples the vehicle engine 11 to the driven mechanisms 12 (such as the vehicle drive wheels), the vehicle having a pneumatic transmission control circuit 13 for actuating the various clutches and brakes of the transmission shifting mechanism 10 to selectively establish one of a plurality of speed ratios in the transmission. When the vehicle is in operation, the hand set valve 14 is actuated to connect the pressurized-air supply tank 15 to the transmission control 13 and the manually operable ratio selector 16. The vehicle operator, by manipulation of control lever 17, can thereby cause pressurized air to flow through selected of the conduits 18, to or from the pneumatic shift control circuit 13, so that the desired speed ratio of the transmission is obtained. During operation of the engine, compressor 19 will be driven to maintain supply tank 15 full and at the pressure necessary to operate the transmission shifting mechanism. When the vehicle is shut down, the hand set valve 14 can be discharged to maintain the pressure in supply tank 15 until such time as the vehicle is to be again put into operation. An illustration of such a pneumatically operated shift control system is that disclosed in U.S. Pat. No. 3,906,813, issued to Webber et. al. on Sept. 23, 1975, the disclosure of which is incorporated herein by reference.

In extreme cold operating conditions, elastomer seals in any control system lose their resilience or ability to conform to a sealing surface. This permits leakage of the control fluid past the elastomer sealing members. This leakage in the control system will continue to occur until the system temperatures reach their normal operating temperature range.

DISCLOSURE OF INVENTION

The present invention is directed to solving the problem and fulfilling the need referred to above.

The solution was to heat the extremely cold control fluid before introducing it into the control system. This, in turn, warms up the elastomer sealing members to their normal operating temperature.

A further aspect of the invention resides in providing an efficient and inexpensive fluid heater for such purpose which will work reliably under the extreme cold conditions wherein such heater is needed to reduce control system leakage.

In this aspect of the invention a fluid heater is provided having an elongated cylindrical heating member, an inner, highly heat conductive tubular sleeve surrounding and spaced from the heating mmeber to form an inner annular space therebetween, and an outer tubular sleeve surrounding the inner sleeve to form an outer annular space therebetween. Air is introduced at one end of the outer annular space and flows therethrough to the other end thereof. The air then passes into the inner annular space and flows therethrough, in direct contact with the heating element, through the length of the inner annular space and then exits from the heater.

Other aspects of the invention will become apparent in the course of the following detailed description.

BRIEF DESCRIPTION OF THE DRAWINGS

In the drawings, wherein like parts are designated by like reference numerals throughout the same.

FIG. 3 is a lengthwise section through the fluid heater of FIG. 2.

BEST MODE FOR CARRYING OUT THE INVENTION

Figure 1:
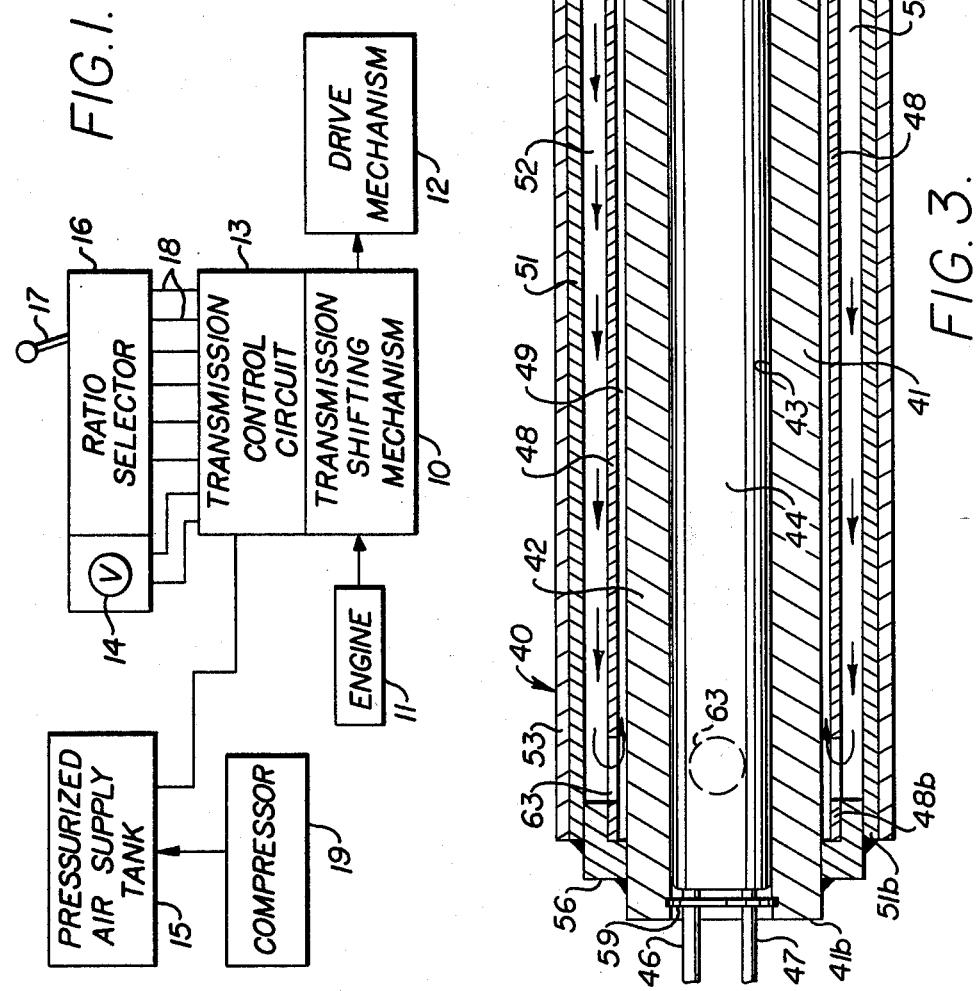
FIG. 1 is a block representation of a pneumatically operated transmission control mechanism for a vehicle transmission in which the present invention is used.

The various elements of the pneumatically operated shift control mechanism of FIG. 1 have already been generally described.

Figure 2:
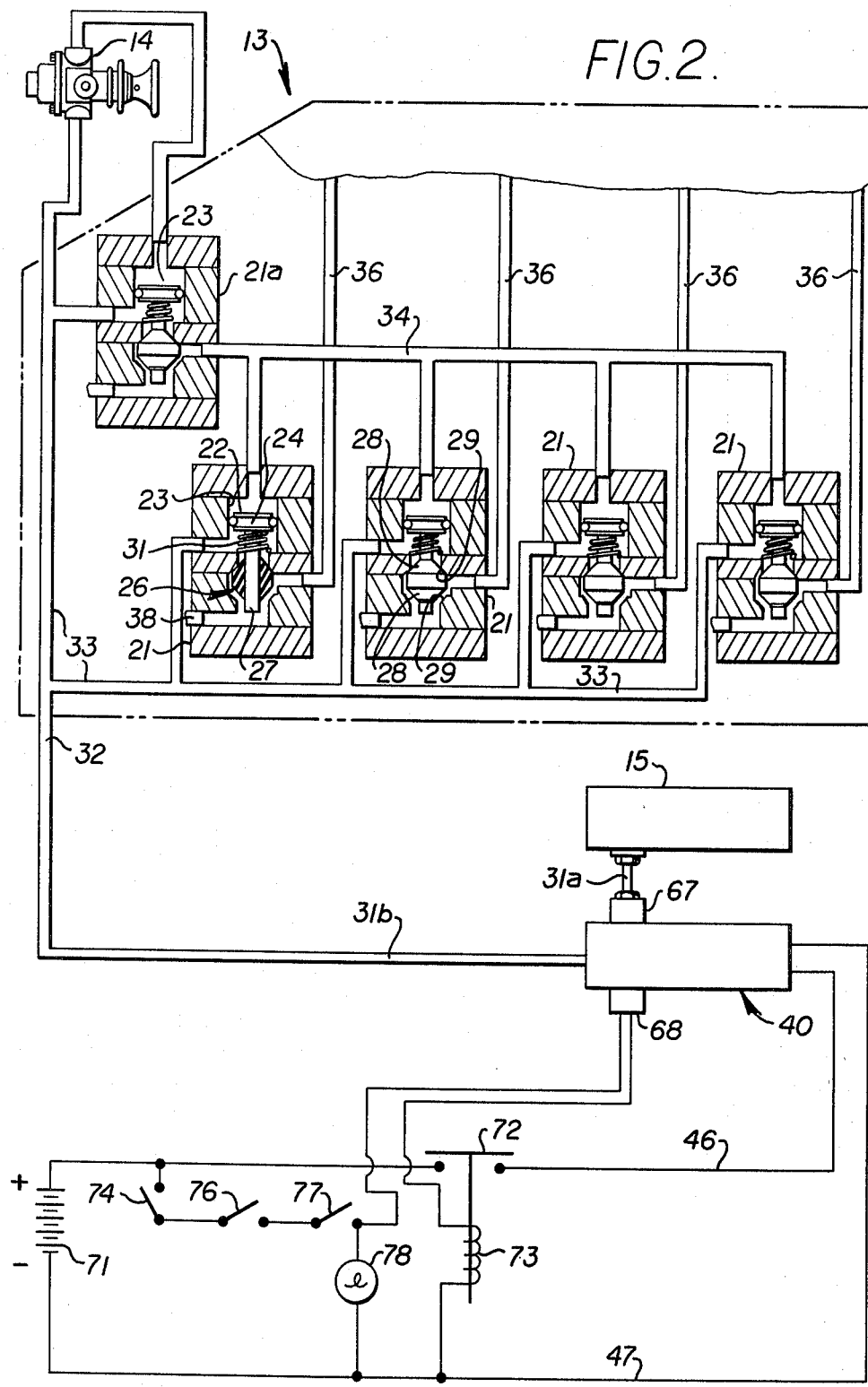
FIG. 2 illustrates portions of the elements of FIG. 1, with elements of the control being in section to show control valves therein and with a fluid heater associated therewith in accordance with the invention.

Referring now to FIG. 2, a portion of the transmission control 13 is shown to illustrate some of the poppet valves 21 therein. Each poppet valve 21 has a piston 22 sealed to pilot chamber 23 by an elastomeric O-ring sealing members 24, and an elastomeric sealing member 26 mounted on piston stem 27. The elastomeric sealing member has two sealing surfaces 28 thereon for alternative sealing with valve seats 29.

Control fluid, e.g. from the pressurized air supply tank 15, is supplied through lines 31a, 31b to the inlet 32 and air lines 33 of transmission control 13. When hand set valve 14 is actuated, control fluid will be delivered to piston chamber 23 of pilot valve 21A, opening the valve 21A to connect line 33 to the pilot line 34 so that the poppet valve 21 will open to deliver control fluid to control lines 36. When sufficient pilot pressure is not present in pilot line 34, springs 37 will move the valve stems 27 upwardly, and control fluid in lines 36 will exhaust through passages 38.

Actuation of level 17 on the ratio selector 16 will send control signals through conduits 18 to transmission control 13 to initiate the desired directional shift movements in the transmission shifting mechanism 10.

In cold environments, the loss of resiliency in the elastomeric sealing material of valves 21 adversely affects the operational capability of the valves. This loss of resiliency is overcome in the present invention by using a fluid heater 40 located between the supply tank 15 and transmission control 13 so that the air coming into contact with the valves 21 is heated. It is further preferable to locate the fluid heater 40 in close proximity with the fluid supply inlet 32 so as to minimize cooling of the fluid after leaving the heater.

The details of the fluid heater 40 are shown in FIG. 3. The fluid heater 40 has an elongated, cylindrical, electrically-energizable heating member 41, with first and second ends 41a and 41b, as the core thereof, heating member 41 preferably comprising an elongated tubular heat sink 42 having an axial bore 43 therethrough and an elongated cylindrical heating element 44 removably inserted in the heat sink bore 43 from the left end thereof. Plug 45 is disposed in the heat sink bore 43 and permanently sealed to the bore to prevent air flow therethrough. Preferably heating element 44 is a standard electrically energized heater cartridge having electrical leads 46 and 47 at one end thereof, and heat sink 42 is made of material with high heat conductivity and good fabrication properties.

An inner, elongated tubular sleeve 48, with first and second ends 48a and 48b, is spaced outwardly from, and surrounds, and extends the length of heat sink 42 and forms therewith an inner annular space 49 between sleeve 48 and heat sink 42. The annular space 49 is sized to provide the minimum flow area necessary to provide the maximum required flow rate. Sleeve 48 has a high coefficient of thermal conductivity and can be made of ferrous or nonferrous material.

An outer, elongated tubular sleeve 51, having first and second ends 51a and 51b, is spaced outwardly from and surround and extends the length of inner sleeve 48 and forms therewith an outer annular space 52 between the sleeves 48 and 51. If desired, an insulating jacket 53 can be placed around outer sleeve 51.

An end cap 54, forming a first closure means, is connected to the first ends 48a and 51a of the inner and outer sleeves to close the outer annular space 52 thereat. End cap 56 is connected to the second ends 48b and 51b of sleeves 48 and 51 to close the outer annular space 52 thereat. The heating element 44 is held in place when inserted in bore 43 by a removable snap ring 59.

A boss 61 at the first end 51a of the outer sleeve is provided for connection of line 31a from supply tank 15 to inlet passage 62 through the outer sleeve into the outer annular space 52. The outer annular space 52 then communicates with the inner annular space 49 by a plurality of passages 63 through the second end 48b of the inner sleeve. Fluid can then exit from the inner annular space 49 through radial passages 64 in the heat sink 42 and into the axial bore 43 thereof and then out through outlet passage 66. As seen in FIG. 2, line 31b can be used to connect the outlet passage so that the heater 40 will discharge directly into the outlet passage 66 to transmission control 13.

A conventional thermal switch unit 68 is mounted on the cap 54 and includes a heat sensing and switch actuating element 69 exposed to the inner annular space 64 to open the normally-closed circuit though the switch unit 68 when the sensed temperature is above a predetermined value.

Referring again to FIG. 2, heater element leads 46 and 47 are connected to the vehicle battery 71 through switch 72 which is operated by solenoid 73. Actuation of solenoid 73 is controlled by manual switch 74, engine oil pressure switch 76, surface temperature switch 77 and thermal switch unit 68. The engine oil pressure switch 76 is normally open and will close on a rise in the oil pressure to allow operation of heater 40 only when the engine is operating and the alternator is being driven. The surface temperature switch 77 limits heater operation to the temperature range below 35° F. when elastomeric resiliency changes and icing occurs. Lamp 78 indicates when solenoid 73 and the heater 40 are energized.

INDUSTRIAL APPLICABILITY

After starting the engine, the operator will close the heater manual control switch 74 which energizes the solenoid 73 to connect heating element 44 to the vehicle battery 71. Heating element 44 preferably has a relatively low resistance so that it will heat rapidly and heat the heat sink 42. Heat sink 42 will in turn inpart heat to inner sleeve 48 by radiation and conduction through the air within the inner annular space 49.

The hand set valve 14 will be actuated by the operator when system air pressure is above 65 psi. Leakage past any valves in the control or ratio selector will cause the pressurized air in supply tank 15 to flow through the fluid heater 40. Such air will first enter the outer annular space 52 and flow to the left therethrough, being prewarmed by contact with the inner sleeve 48. The prewarmed air then enters into the inner annular space 49, coming into direct contact with the heat sink 42 and flowing then to the right through the inner annular space and out through outlet passage 66 into the control passages 33 of the transmission control.

The double chamber arrangment of the inner and outer annular spaces 49 and 52 provides for reliable operation even in extremely cold temperature conditions. Desirably, the temperature of the heated air exiting from the heater should be in the order of about 65° C. so that poppet valves 21 and 21A will operate as intend. The temperature of the air entering the heater 40 may be in the order of −46° C.

The counter-current flow relation of the air in the inner and outer annular spaces 49 and 52 is advantageous in that the air flowing through the inner annular space will become progressively hotter as it moves to the right, and the inner sleeve 48 will likewise become progressively hotter to the right. As a consequence, the incoming air will first contact inner sleeve 48 at its hottest point and will be rapidly heated thereby so that undue time is not required for preheating of the air in the outer annular space before the air enters the inner annular space.

The thermal switch unit 68 is provided to keep the fluid heater 40 from overheating. With a fluid heater as shown herein, the air temperature at the outlet will be about 65° C. when the air temperature at the left end of the outer annular space 52 is about 0° C. Accordingly, a thermal switch unit 68 with a 65° C. operating point is used to deenergize solenoid 73 and open switch 72 to disconnect the heating element 44 from the battery when the sensed temperature rises to that value and to reconnect the heating element when the temperature thereafter drops to a point wherein the thermal switch unit will again close.

With heated air quickly supplied to the transmission control 13, the operator can secure normal response to a shift command.

In due time the continued operation of the engine and transmission will warm the transmission control to a point wherein the incoming air will be sufficiently heated by and in the control for reliable operation without further need for preheating by heater 40. At such time the surface temperature switch 77 will open to disconnect the heating element 44 from battery 71 and thereby conserve battery power.

The use of the heat sink 42 and heating element combination as the heating element 44 for the fluid heater 40 has several advantages. For example, the heat sink 42 prevents direct contact between the air flowing through the inner annular space 49 and the heating element 44. Additionally, the relative large heat capacity of the heat sink will reduce the number of times that the heating element 44 must be turned on and off to maintain the temperature at the desired level, thus prolonging the life of the heating element. Also, as will be noted from the drawings, the plug 45 isolates the axial bore 43 to the left thereof from the high pressure air flowing through the unit. As a consequence, no fluid seal is required between the heating member 44 and the end cap 56 or heat sink 42. Likewise, heating element 44 may be removed from the fluid heater 40, for servicing or replacement, without affecting the pressure in the pneumatic circuits.

Other aspects, objects, and advantages of this invention can be obtained through a study of the drawings, the disclosure, and the appended claims.

We claim:

1. In a vehicle having a pneumatic control (13) responsive to pneumatic pressure for actuating a shifting mechanism (10) to selectively establish one of a plurality of ratios from an engine (11) to a driven mechanism (12), a pressurized air supply tank (15) connected to said control (13), said control (13) having at least one poppet valve (21) for selectively using pressurized air from said supply tank (15) to actuate said shifting mechanism (10) or for exhausting said air, said poppet valve (21) having an elastomeric seal (28) for normal sealing against such exhaust, the improvement comprising:

fluid heater means (40) for heating air flowing from said air supply tank (15) to said control valve (21), downstream of said air supply tank and upstream of said control valve.

2. The improvement as set forth in claim 1 wherein said heater means (40) is positioned in close proximity to said control (13).

3. In a vehicle as set forth in claim 1 and in which said vehicle has a battery (71), the improvement further being that said heater means (40) includes an electrically energizable heating element (44) connectable to said battery 71.

4. In a vehicle as set forth in claim 3, the improvement further comprising:

means (68) for sensing the temperature of the air being heated by said heater means (40) and for connecting said heating element (44) to said battery (71) when said control is below a predetermined temperature and for disconnecting said heating element from said battery when said control is above a predetermined temperature.

5. The improvement as set forth in claim 1, wherein said heater means (40) is positioned in close proximity to said control (13), said heater means having an inlet passage (62) thereinto and an outlet passage (66) therefrom, said inlet passage (62) being connected to said air supply tank (15) and said outlet passage (66) being connected to said control (13), and an electrically-energizable heating element (44) disposed in said heater means (40).

6. The improvement as set forth in claim 1, wherein said fluid heater means (40) comprises:

an elongated cylindrical heating member (41), an inner elongated tubular sleeve (48) spaced outwardly and around said heating member (41), said inner sleeve (48) and heating member (41) forming an inner annular space (49) therebetween, said inner sleeve (48) having a high coefficient of thermal conductivity, an outer elongated tubular sleeve (51) spaced outwardly and around said inner sleeve (48), said inner and outer sleeve forming an outer annular space (25) therebetween, said heating member (41) and said sleeves (48,51) each having first and second ends (41a,41b,-48a,48b,51a,51b), first closure means (54) for closing the outer annular space (52) between said inner and outer sleeves (48,51) at their first ends (48a,51a), second closure means (56) for closing the inner and outer annular spaces (49,52) between said heating member (41) and said inner and outer sleeves (48,51) at their second ends (41b,48b,51b), said outer sleeve (51) having an inlet passage (62) therethrough at the first end (51a) thereof, and into said outer annular space (52), said inner sleeve (48) having at least one passage (63) therethrough at the second end (48b) thereof communicating said inner and outer annular spaces (49,52), said fluid heater (40) having an outlet passage (64,43,66) therefrom in close proximity to the first end (48a) of said inner sleeve (48) and in fluid communication with said inner annular space (49).

* * * * *